US010922302B2

(12) United States Patent
Wickenhauser (10) Patent No.: US 10,922,302 B2
(45) Date of Patent: Feb. 16, 2021

(54) DATA TIME STAMPS (71) Applicant: Vital Connect, Inc., San Jose, CA (US)

(72) Inventor: Tyler Wickenhauser, San Jose, CA (US)

(73) Assignee: Vital Connect, Inc., San Jose, CA (US)

( * ) Notice: Subject to any disclaimer, the term of this patent is extended or adjusted under 35 U.S.C. 154(b) by 599 days.

(21) Appl. No.: 15/670,358

(22) Filed: Aug. 7, 2017

(65) Prior Publication Data

US 2019/0042614 A1 Feb. 7, 2019

(51) Int. Cl.
*H04L 12/24* (2006.01)
*G06F 16/23* (2019.01)
*H04L 12/26* (2006.01)
*H04W 56/00* (2009.01)

(52) U.S. Cl.
CPC ........ *G06F 16/2322* (2019.01); *H04L 43/106* (2013.01); *H04W 56/002* (2013.01)

(58) Field of Classification Search
CPC . G06F 16/2322; H04L 43/106; H04W 56/002
USPC ........................................................ 709/248
See application file for complete search history.

(56) References Cited

U.S. PATENT DOCUMENTS

| | | | | |
|---|---|---|---|---|
| 5,694,940 A * | 12/1997 | Unger | .................. | A61B 5/0006 128/903 |
| 5,810,747 A * | 9/1998 | Brudny | .................. | A61B 5/486 128/924 |
| 7,448,996 B2 * | 11/2008 | Khanuja | .............. | A61B 5/0002 600/300 |
| 8,427,525 B2 * | 4/2013 | Funabiki | ................ | G09G 3/003 348/43 |
| 8,621,126 B2 * | 12/2013 | Sueyoshi | ............. | H04B 5/0031 455/41.1 |
| 9,299,102 B1 * | 3/2016 | Pike | .................... | G06Q 30/0641 |
| 9,320,116 B2 * | 4/2016 | Lydecker | ........... | H05B 37/0227 |
| 10,178,636 B2 * | 1/2019 | Zhang | .................... | H04B 7/269 |
| 10,225,012 B2 * | 3/2019 | Miyaho | ................ | H04B 10/116 |
| 10,284,633 B1 * | 5/2019 | Delaney | .............. | H04L 41/0806 |
| 10,290,071 B2 * | 5/2019 | Heil | ........................ | G06Q 50/22 |
| 10,348,598 B2 * | 7/2019 | Kawakami | .............. | H04L 43/10 |
| 2005/0036512 A1 * | 2/2005 | Loukianov | ............ | H04J 3/0632 370/469 |
| 2007/0213028 A1 * | 9/2007 | Shohara | ............ | H04W 52/0216 455/343.1 |
| 2008/0039119 A1 * | 2/2008 | Crawford | ................ | G01S 5/021 455/456.1 |
| 2015/0323984 A1 * | 11/2015 | Ganton | ..................... | G06F 1/28 713/323 |

* cited by examiner

*Primary Examiner* — Tauqir Hussain
(74) *Attorney, Agent, or Firm* — Brundidge & Stanger, P.C.

(57) ABSTRACT

A first device gathers data samples, transmits a timing table for the device, and also transmits the gathered data sample, using at least one short range wireless connectivity standard protocol. A second device receives the timing table and the data sample from the first device, and determines a real-time clock time stamp for the data sample based on the device timing table.

14 Claims, 5 Drawing Sheets

DATA TIME STAMPS

BACKGROUND

Wireless data sampling devices are used in a variety of contexts. Accuracy is required not only with regard to the gathering of data samples but also with regard to the timing thereof.

SUMMARY

In one example embodiment, a system may include a first device that gathers data samples, transmit a timing table for the device, and also transmits the gathered data sample, using at least one short range wireless connectivity standard protocol. The system also includes a second device that receives the timing table and the data sample from the first device, and determines a real-time clock time stamp for the data sample based on the device timing table.

In another example embodiment, a non-transitory computer-readable medium, associated with a wireless device, may store instructions that, when executed, cause one or more processors to perform operations including receiving a real-time stamp from an external device when the wireless device is powered-on, gathering a data sample, preparing a data package that includes a device timing table and the gathered data sample, and transmitting the data package to another device.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

In the detailed description that follows, embodiments are described as illustrations only since various changes and modifications will become apparent to those skilled in the art from the following detailed description. The use of the same reference numbers in different figures indicates similar or identical items.

DETAILED DESCRIPTION

In the following detailed description, reference is made to the accompanying drawings, which form a part of the description. In the drawings, similar symbols typically identify similar components, unless context dictates otherwise. Furthermore, unless otherwise noted, the description of each successive drawing may reference features from one or more of the previous drawings to provide clearer context and a more substantive explanation of the current example embodiment. Still, the example embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein and illustrated in the drawings, may be arranged, substituted, combined, separated, and designed in a wide variety of different configurations, all of which are explicitly contemplated herein.

Figure 1:
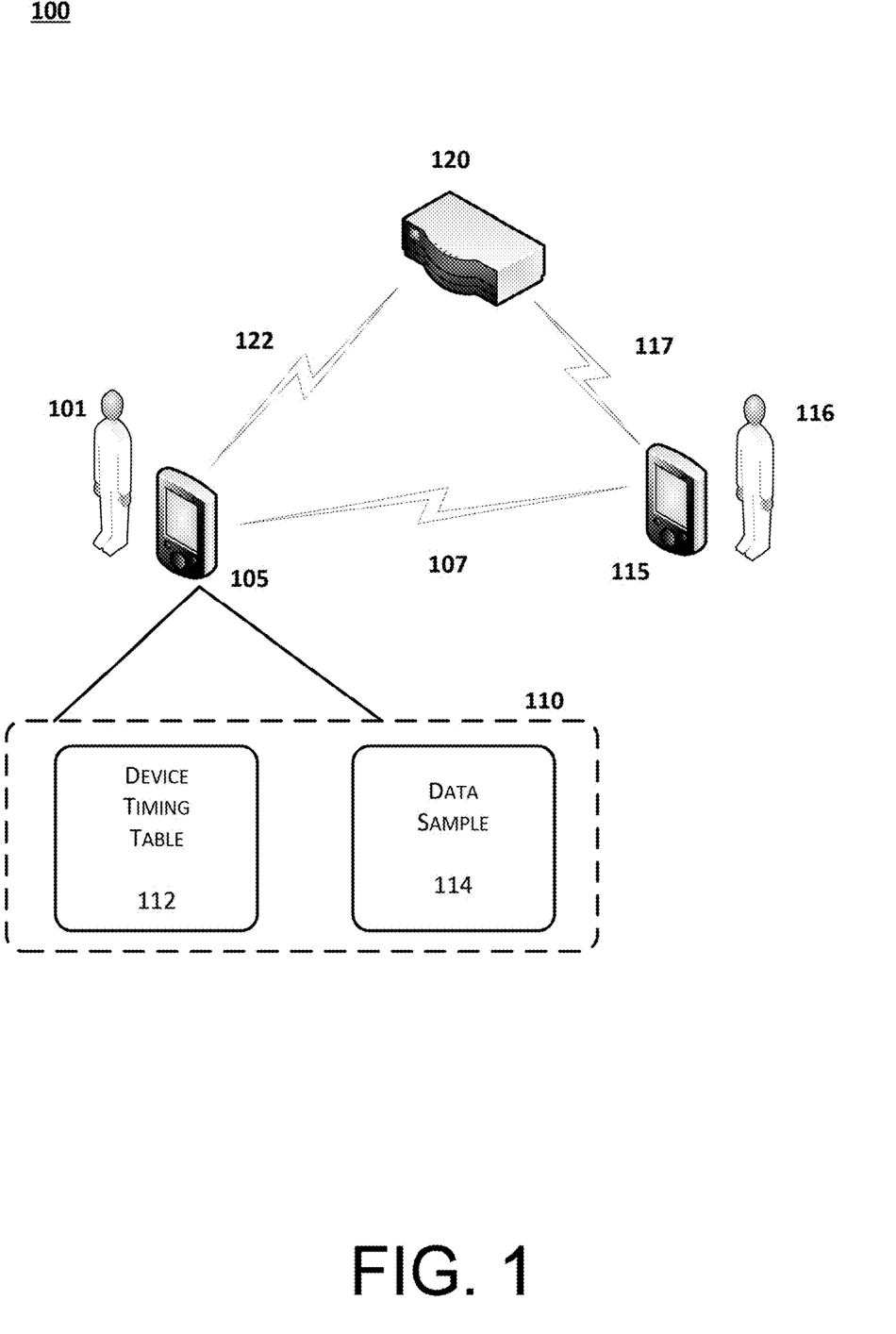
FIG. 1 shows an example system configuration in which one or more embodiments of data time stamps may be implemented.

FIG. 1 shows an example system configuration in which one or more embodiments of data time stamps may be implemented.

In at least one example embodiment, system 100 includes, at least, first wireless device 105 corresponding to user 101; data packet 110, which includes one or both of device timing table 112 and data sample 114, data packet 110 capable of being transmitted from first wireless device 105; second wireless device 115 corresponding to user 116; data hub 120; and communication link 107 between first wireless device 105 and second wireless device 115, communication link 117 between second wireless device 115 and data hub 120, and communication link 122 between first wireless device 105 and data hub 120.

User 101, who may alternately be referred to as user of first wireless device 105, may be regarded as a person to whom first wireless device 105 belongs, is being used by, or otherwise corresponds.

First wireless device 105 may refer to a wireless device that may be designed, configured, and/or programmed to, at least, gather, collect, and/or compile data samples, as well as to transmit at least portions of the data samples to other devices, e.g., second wireless device 115 and/or data hub 120. As a non-limiting example, first wireless device 105 may be a wireless medical monitoring device that gathers physiological data, e.g., pulse rate, blood pressure, body temperature, breathing patterns, etc., from patient 101.

First wireless device 105 may be implemented without having a real-time clock, i.e., a hardware mechanism allowing the device to track date and time for various purposes. Instead, first wireless device 105 may be implemented with a crystal oscillator that creates an electric signal with a precise frequency, thus providing a device-specific system tick-rate. The tick-rate may refer to a number of ticks for the device, per the frequency of the crystal oscillator, with a "tick" referring to a single oscillation of the electric signal between a digital high and a digital low. The system tick-rate may be utilized for the calculation of relative differences between points in time. For example, if the crystal oscillator implemented in first wireless device 105 operates at 1 Hz, i.e., at a period of 1 second, the system tick-rate may be one (1) tick-per-second. Thus, the tick-rate may be relied upon as having 3600 ticks per 24 hours. First wireless device 105 may have stored therein a device timing table that includes the unique system tick-rate for the device that provides the tick-rate, or period, for the crystal oscillator of the respective device. The tick-rate may differ from one device to another.

The timing table may also include a time-stamp received from an external device, e.g., data hub 120, at the time the device is powered-on; the system tick-count at the time the device is powered-on, the system tick-count at the time each respective data sample is gathered or collected, and the system tick-count for first wireless device 105 when the device is powered-off, serving to distinguish between the start and end points of consecutive powered-on sessions.

As stated before, the time-stamp may be received from an external device, e.g., data hub 120, to which first wireless device 105 is communicatively connected. That is, by at least some example embodiments, the external device may frequently and/or periodically ping first wireless device 105 with, e.g., an advertisement, which is an indicator that the external device is available for a communicative connection or a request for a communicative connection. Regardless of the purpose for the ping, it may include a time-stamp that indicates the real-time of the transmission thereof to first wireless device 105. Therefore, when first wireless device 105 powers-on, it may capture and store in the timing table the time-stamp for the received ping. The timing table for first wireless device 105, consequently, may be updated upon powering-on so as to record thereon the time-stamp of the ping as well as the corresponding tick-count.

First wireless device 105 may be designed, configured, and/or programmed to transmit digital representations of the gathered data samples to second wireless device 115 via communication link 107 and/or to data hub 120 via communication link 122. The system timing table corresponding to first wireless device 105 may be embedded in, attached to, or otherwise associated with the gathered data samples collectively as part of data packet 110, or individually, as transmitted from first wireless device 105.

Communication link 107 and communication link 122 may each include at least one short range wireless connectivity standard protocol, e.g., Bluetooth Low Energy (BLE); a near-field communication (NFC) protocol, etc. Alternatively, or in addition, communication link 107 and/or and communication link 122 may include a wired network such as LAN (Local Area Network), WAN (Wide Area Network), VAN (Value Added Network) or the like, or any one or more of known wireless networks, e.g., a mobile radio communication network, a satellite network, WiBro (Wireless Broadband Internet), Mobile WiMAX, HSDPA (High Speed Downlink Packet Access) or the like.

User 116, who may alternately be referred to as user of second wireless device 115, may be regarded as a person to whom first wireless device 115 belongs, is being used by, or otherwise corresponds.

Second wireless device 115 may refer to a wireless device that may be designed, configured, and/or programmed to, at least, receive at least portions of data samples from first wireless device 105.

As a non-limiting example, first wireless device 105 and even second wireless device 115 may be implemented as a biosensor monitoring device within a particular facility, e.g., hospital, clinic, etc., and may be designed, programmed, and/or configured to gather, collect, and/or compile physiological data, e.g., pulse rate, blood pressure, body temperature, breathing patterns, etc., from the corresponding patient or user. Further, first wireless device 105 and second wireless device 115 may be designed, programmed, and/or configured to transmit digital representations of the physiological data to one or more instances of data hub 120 via communication link 122 and 107, respectively, which may include BLE, an NFC protocol, etc.

In at least one alternative embodiment, first wireless device 105 and/or second wireless device 115 may be implemented as a processor-enabled device including, but not limited to, a notebook computer, laptop computer, tablet computer, smart phone, etc., that may be communicatively connected to each other and/or data hub 120. However, since data sample time-stamps are more likely to be implemented for wireless devices that lack a processor, and therefore lack a real-time clock, it is more likely that first wireless device 105 is to be implemented as a processor-less device, though the embodiments described herein do not preclude a processor.

Data hub 120 may be implemented as a processor-enabled device including, but not limited to, a router, Wi-Fi hot-spot, or relay computer, e.g., notebook, laptop, smart phone, etc., that may be communicatively connected with first wireless device 105 and/or second wireless device 115. Data hub 120 may be capable of receiving, compiling, and/or processing the data samples received from first wireless device 105.

In at least one embodiment, either or both of second wireless device 115 and data hub 120 may receive at least some of the gathered data samples from first wireless device 105, respectively, via communication links 107 and 122. The system timing table corresponding to first wireless device 105 may be embedded in, attached to, or otherwise associated with the gathered data samples as part of data packet 110, or individually, as transmitted from first wireless device 105. For descriptive purposes only, the embodiments of data time stamps hereafter will refer to data hub 120 receiving the gathered data samples from first wireless device 105 as part of data packet 110, although such examples are not limiting, as the features and functions described below and attributed to data hub 120 may further be attributed to at least, e.g., second wireless device 115.

Data hub 120 may be designed, programmed, and/or configured to, upon receiving the gathered data samples and system timing table in data packet 110 from first wireless device 105, extract the system timing table from the gathered data samples or otherwise access the tick-count data from the system timing table. Accordingly, data hub 120 may extract the time-stamp and the corresponding system tick-count at the time first wireless device 105 is powered-on and the system tick-count at the time each respective data sample is gathered or collected by or at first wireless device 105.

Data hub 120, may be further designed, programmed, and/or configured to: having accessed the system tick-count for first wireless device 105 when powered-on, determine the real-time tick-rate for first wireless device 105; assign the real-time timestamp to the tick-count when first wireless device 105 was powered-on; for each gathered data sample, subtract the tick-count at the time-first wireless device 105 was powered-on from the tick-count for the respective data samples; and calculate a real-time time-stamp for each respective data sample by multiplying the difference between the tick-count at the time-first wireless device 105 was powered-on and the tick-count for each respective data sample by the real-time tick-rate for first wireless device 105.

Then, the calculated real-time time-stamp for each gathered data sample may be used for various monitoring and testing purposes when retrieved and/or received from data hub 120.

Figure 2:
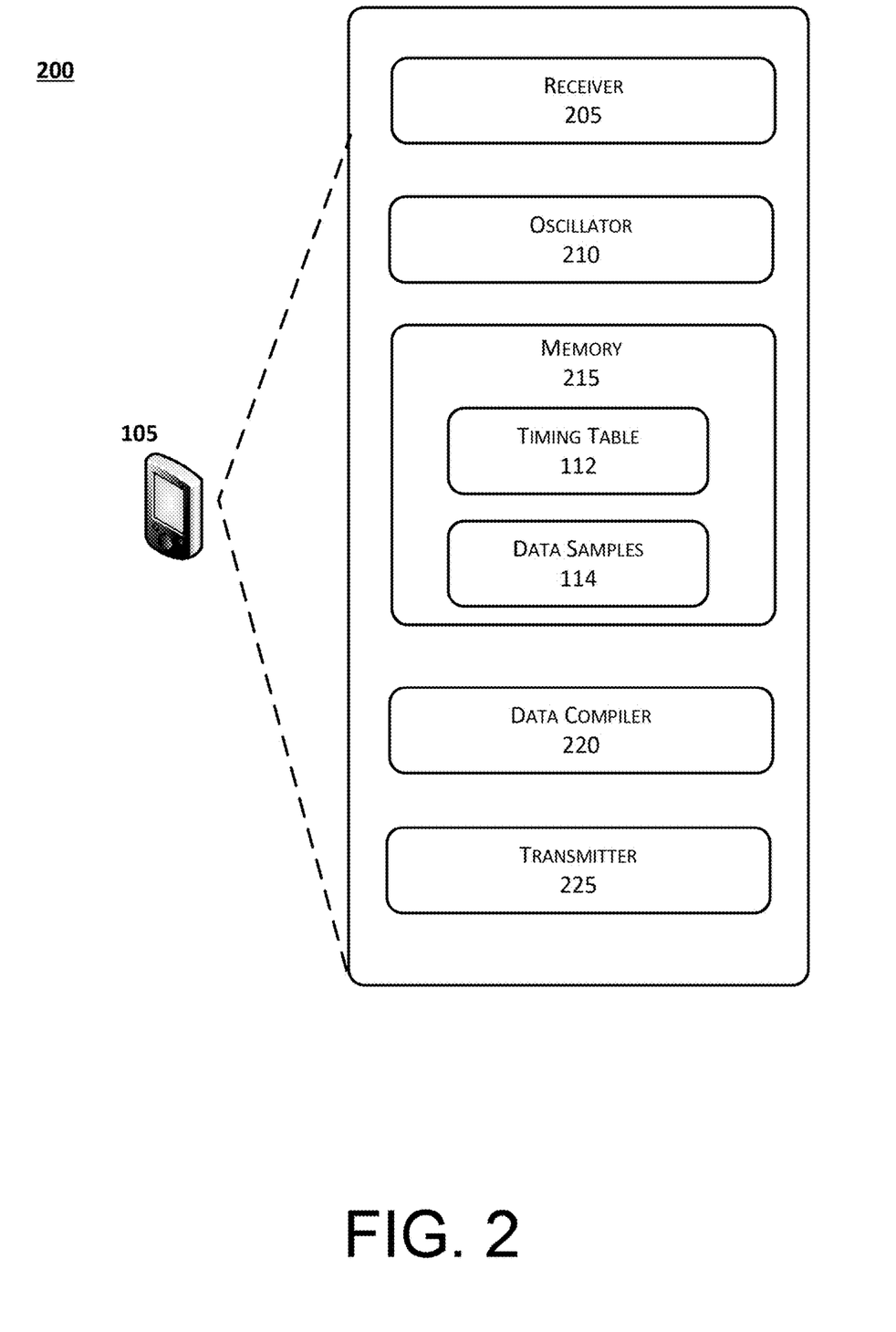
FIG. 2 shows an example embodiment of a wireless device by which at least portions of data time stamps may be implemented.

FIG. 2 shows an example embodiment of a wireless device by which at least portions of data time stamps may be implemented.

As depicted, first wireless device 105 may include receiver 205; crystal oscillator 210; memory 215, in which one or both of timing table 112 and gathered data samples 114 may be stored; data compiler 220; and transmitter 225. Although illustrated as discrete components, these various components may be divided into additional components, combined into fewer components, or eliminated altogether while being contemplated within the scope of the disclosed subject matter. Further, it will be understood by those of ordinary skill in the art that each example component may be implemented, individually and/or collectively, by a wide range of hardware, software, firmware, or virtually any combination thereof.

Receiver 205 may refer to one or more storage components of first wireless device 105 that may be designed, programmed, and/or configured to, at least, gather, collect, and/or compile data samples. As a non-limiting example, first wireless device 105 may be a wireless medical monitoring device that gathers physiological data samples, e.g., pulse rate, blood pressure, body temperature, breathing patterns, etc., from patient 101.

Further, receiver 205 may be designed, programmed, and/or configured to receive from an external device, e.g., data hub 120, a time-stamp at the time that first wireless device 105 is powered-on. Pings that include an advertisement for a communicative connection from the external device may include a time-stamp that indicates the real-time of the transmission thereof to first wireless device 105. Therefore, when first wireless device 105 is powered-on, it may capture and store in the timing table the time-stamp for the received ping.

Crystal oscillator 210 may refer to a circuit utilizing the mechanical resonance of vibrating piezoelectric material, i.e., crystal, to create an electrical signal with a predictable frequency. Based on the frequency of crystal oscillator 210, a tick-rate may be determined, the tick-rate referring to a number of clock ticks for the device, per a predetermined amount of time; and a "tick" referring to a single oscillation between a digital high and a digital low.

Memory 215 may refer to one or more storage components of first wireless device 105 that may be designed, programmed, and/or configured to store, at least temporarily, one or more data samples 215 from patient 101. Data samples 215 may be gathered or collected by one or more sensors incorporated in, attached to, or otherwise associated with first wireless device 105.

Further, memory 215 may be designed, programmed, and/or configured to store system timing table 112 that includes a time-stamp that indicates the real-time of the transmission thereof to first wireless device 105. Therefore, when first wireless device 105 is powered-on, it may capture and store in timing table 112 the time-stamp for the received ping. Timing table 112, consequently, may be updated upon powering-on so as to record thereon the time-stamp of the ping as well as the corresponding tick-count.

Data compiler 220 may refer to a component of first wireless device 105 that may be designed, programmed, and/or configured to capture a tick-count when a respective one of data samples 215 is collected and associate the captured tick-count with the collected data sample. Further, data compiler 220 may be designed, programmed, and/or configured to further embed, attached, or otherwise associate timing table 112 with each respective gathered data sample or, alternatively, each grouping of the respective data samples that are to be transmitted together, all as part of data packet 110.

Transmitter 225 may refer to a component of first wireless device 105 that may be designed, programmed, and/or configured to transmit data packet 110 that includes at least portions of gathered data samples 114 and the embedded, attached, or otherwise associated timing table 112 to other devices, e.g., data hub 120 and/or second wireless device 115.

According to at least one alternative embodiment, data compiler 220 may associate the captured tick-count and the collected data retroactively. That is, after transmitter 225 has transmitted data packet 110 to other devices, e.g., data hub 120 and/or second wireless device 115, the captured-tick count may be transmitted in a subsequent transmission, e.g., if the captured tick-count is somehow missing, with the subsequent transmission being implemented upon request received from the other device.

Figure 3:
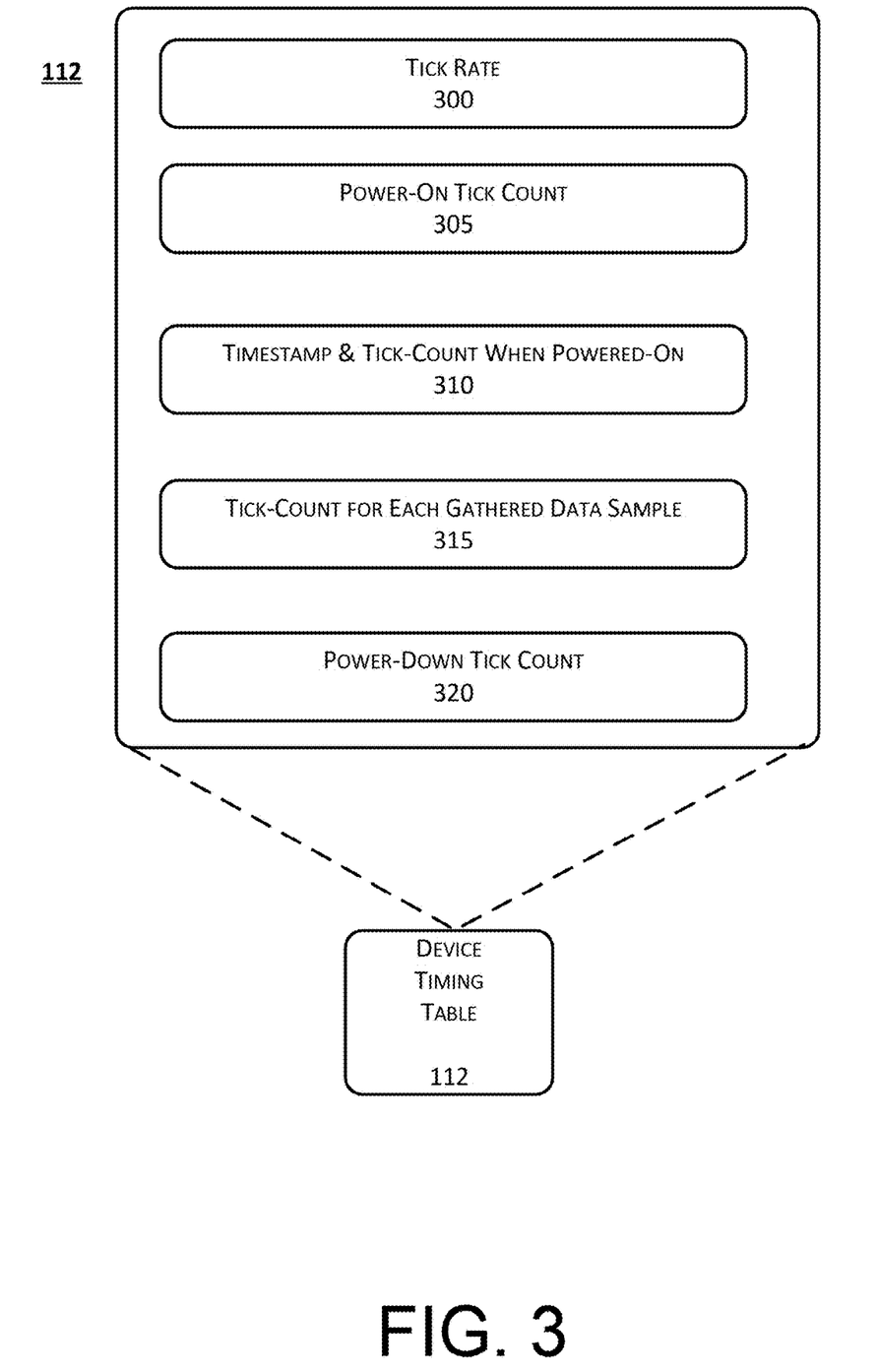
FIG. 3 shows an example configuration of a device timing table according to one or more implementations of data time stamps.

FIG. 3 shows an example configuration of device timing table 112 according to one or more implementations of data time stamps.

As depicted, device timing table 112 may include system tick rate 300; a power-on tick count 305 for first wireless device 105; a timestamp, and corresponding tick-count, 310 issued and/or received at the time first wireless device 105 is powered-on; a tick-count 315 for each gathered data sample; and a power-off tick count 320 for first wireless device 105. Although illustrated as discrete components, these components of device timing table 112 may be divided into additional components, combined into fewer components, or eliminated altogether while being contemplated within the scope of the disclosed subject matter.

System tick-rate 300 may refer to a data component indicative of the device-specific system clock that operates at a device-specific system tick-rate. The tick-rate may refer to a number of ticks for the device for a predetermined measure of time, per the frequency of crystal oscillator. System tick-rate 300 may be utilized to calculate relative differences between points in time. System tick-rate 300 may differ from one device to another.

Power-on tick count 305 may refer to a data component indicative of the tick-count for first wireless device 105 at the time the device is powered-on.

Timestamp and tick-count 310 at the time first wireless device 105 is powered on may refer to a data component indicative of the time-stamp received from an external device, e.g., data hub 120, at the time first wireless device is powered-on, as well as the corresponding, i.e., simultaneous, tick-count for first wireless device 105, as received by receiver 205.

Tick-count 315 for each gathered data sample 315 may refer to a data component indicative of a tick-count for each respective one of data samples 215, or a collection thereof, that is collected or gathered by data compiler 220.

Power-down tick-count 320 may refer to a data component indicative of the system tick-count for first wireless device 105 when the device is powered-off.

As set forth above, system timing table 112 corresponding to first wireless device 105 may be embedded in, attached to, or otherwise associated with the gathered data samples, individually and/or collectively, as transmitted from first wireless device 105.

Figure 4:
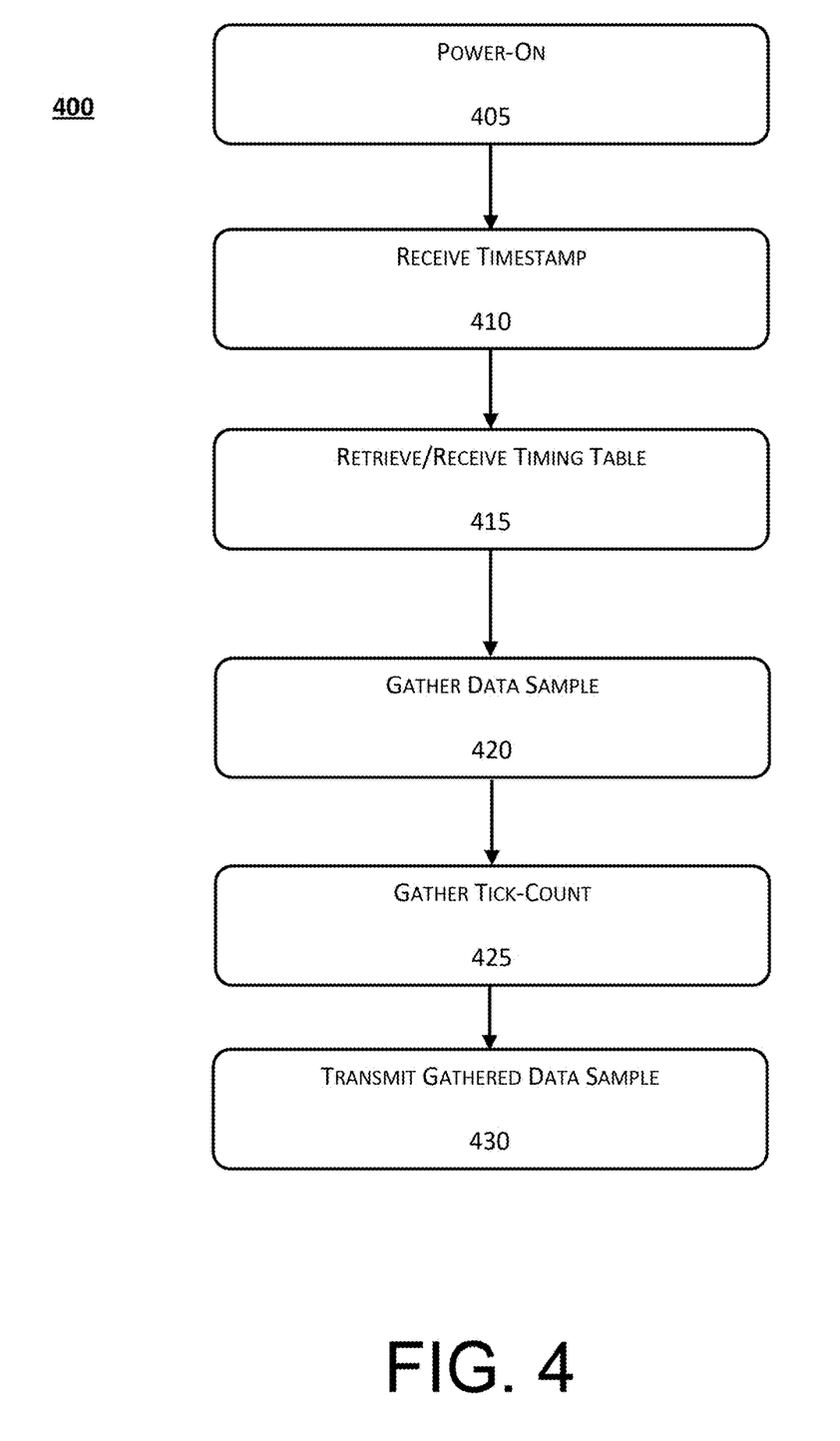
FIG. 4 shows an example processing flow of operations for implementing at least portions of data time stamps.

FIG. 4 shows an example processing flow of operations for implementing at least portions of data time stamps.

The operations of FIG. 4 may be implemented by first wireless device 105, second wireless device 115, and/or data hub 120. For descriptive purposes, FIG. 4 is described with regard to first wireless device 105 transmitting to data hub 120, though such example is not in any way limiting. Alternative implementations may contemplate first wireless device 105 transmitting to second wireless device 115, in addition to or alternatively. An example process may include one or more operations, actions, or functions as illustrated by one or more blocks 405, 410, 415, 420, 425, and 430. Although illustrated as discrete blocks in a particular sequence, the operations illustrated in the figure and described below are only provided as examples. Some of the operations may be optional, combined into fewer operations, expanded into operations, and/or implemented in different order, without detracting from the essence of the disclosed embodiments. Processing may begin at block 405.

Block 405 (Advertise for Communicative Connection) may refer to first wireless device 105 powering-on, either automatically or by input from user 101. Processing may proceed from block 405 to block 410.

Block 410 (Receive Timestamp) may refer to first wireless device 105, at the time of powering-on, receiving a timestamp from an external device, e.g., data hub 120, to which first wireless device 105 is communicatively connected. That is, by at least some example implementations, the external device may frequently and/or periodically ping first wireless device 105 with, e.g., an advertisement, which is an indicator that the external device is available for a communicative connection or a request for a communicative connection. The ping may include a time-stamp that indicates the real-time of the transmission thereof to first wireless device 105. Thus, when first wireless device 105 powers-on, it may capture and store in the timing table the time-stamp for the received ping, and a system tick-count for first wireless device 105 may be captured or associated to the time-stamp, and timing table 112 may be updated upon powering-on so as to record thereon the time-stamp of the ping as well as the corresponding tick-count. Processing may proceed from block 410 to block 415.

Block 415 (Retrieve/Receive Timing Table) may refer to data compiler 220 retrieving or otherwise receiving timing table 112 from memory 215. Processing may proceed from block 415 to block 420.

Block 420 (Gather Data Sample) may refer to receiver 205 and/or compiler 220 gathering, collecting, and/or compiling one or more data samples. In the non-limiting example described above, first wireless device 105 may be a wireless medical monitoring device that gathers physiological data samples, e.g., pulse rate, blood pressure, body temperature, breathing patterns, etc., from patient 101. Processing may proceed from block 420 to block 425.

Block 425 (Gather Tick-Count) may refer to receiver 205 and/or compiler 220 assigning the system tick-count for first wireless device 105 at the time each data sample is gathered, collected, and/or compiled. Processing may proceed from block 425 to 430.

Block 430 (Transmit Gathered Data Samples) may refer to transmitter 225 transmitting data packet 110 that includes at least portions of gathered data samples 114 and the embedded, attached, or otherwise associated timing table 112 to other devices, e.g., data hub 120 and/or second wireless device 115.

Figure 5:
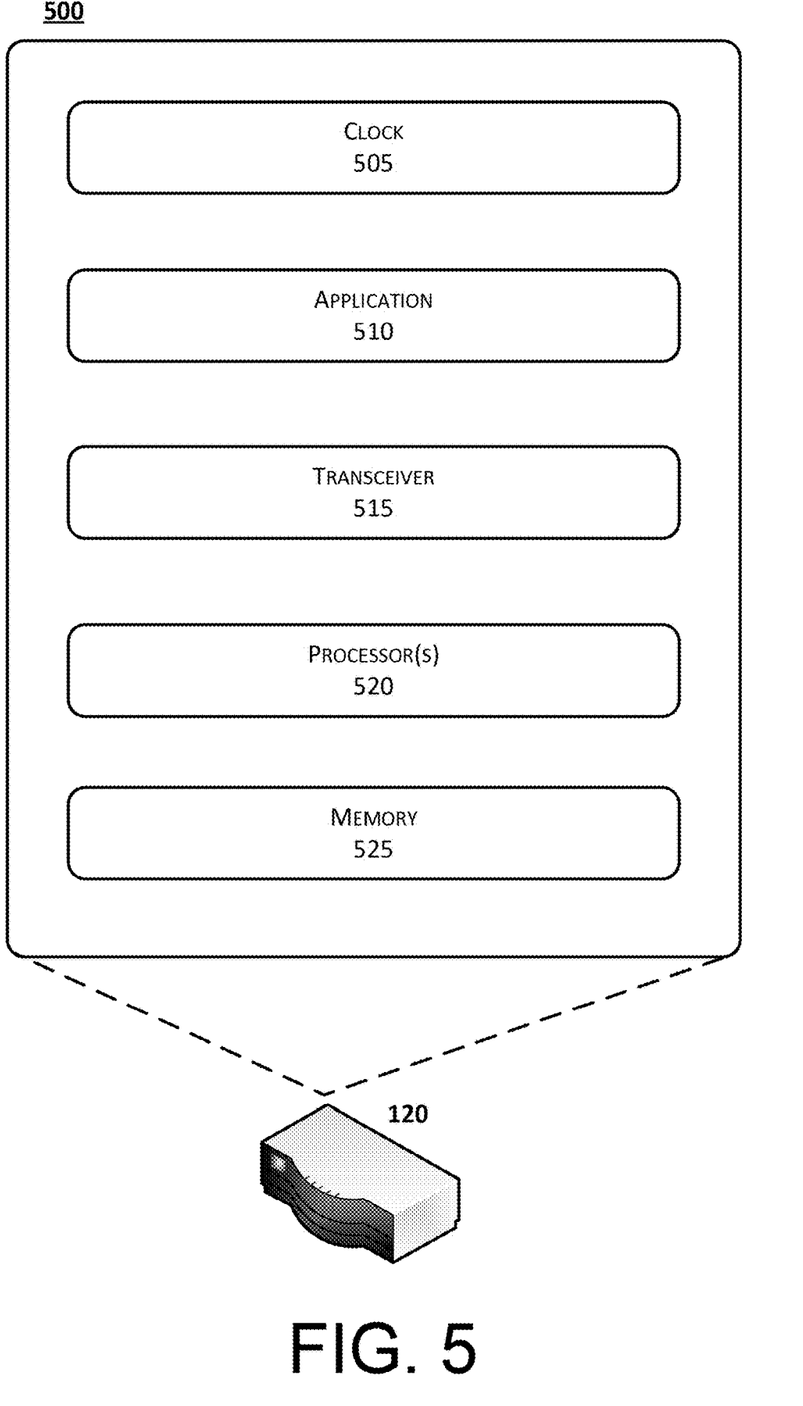
FIG. 5 shows an example configuration of a data hub according to one or more implementations of data time stamps.

FIG. 5 shows an example configuration of data hub 120 according to one or more implementations of data time stamps.

As depicted, data hub 120 may include clock 505, application 510, transceiver 515, processor(s) 520, and memory 525. Although illustrated as discrete components, these various components may be divided into additional components, combined into fewer components, or eliminated altogether while being contemplated within the scope of the disclosed subject matter. Further, it will be understood by those of ordinary skill in the art that each example component may be implemented, individually and/or collectively, by a wide range of hardware, software, firmware, or virtually any combination thereof.

Clock 505 may refer to a component of data hub 120 that may be designed, programmed, and/or configured to generate a time-stamp that is to be embedded, attached, or otherwise associated with data that is received by and transmitted from data hub 120.

Application 510 may refer to a component of data hub 120 that may be designed, programmed, and/or configured to designed, programmed, and/or configured to manage connections to first wireless device 105 and/or second wireless device 115. Accordingly, application 510 may generate an advertisement to be transmitted to first wireless device 105 advertising for or requesting a communicative connection thereto. Each advertisement may be generated with a time-stamp embedded, attached, or otherwise associated therewith.

Transceiver 515 may refer to a component of data hub 120 that may be designed, programmed, and/or configured to transmit a pinging signal with, e.g., an advertisement generated by application 510, to at least first wireless device 105 and second wireless device 115.

Transceiver 515 may also be designed, programmed, and/or configured to receive data packet 100 that includes data samples, both individually and collectively, from at least first wireless device 105. The received data samples may have timing table 112 embedded, attached, or otherwise associated therewith.

Accordingly, application 510 may be further designed, programmed, and/or configured to extract system timing table 112 from the received data samples to thereby access the tick-count data. Thus, application 510 may be designed, programmed, and/or configured to extract the time-stamp and the corresponding system tick-count at the time first wireless device 105 is powered-on and the system tick-count at the time each respective data sample is gathered or collected by or at first wireless device 105. Having accessed the system tick-count for first wireless device 105 when powered-on, the real-time tick-rate for first wireless device 105 may be determined; the real-time timestamp may be assigned to the tick-count when first wireless device 105 was powered-on; for each gathered data sample, the tick-count at the time-first wireless device 105 was powered-on may be subtracted from the tick-count for the respective data samples; and a real-time time-stamp for each respective data sample may be calculated by multiplying the difference between the tick-count at the time-first wireless device 105 was powered-on and the tick-count for each respective data sample by the real-time tick-rate for first wireless device 105.

Processor(s) 520 may refer to one or more processors that enable the functionality of the various components of data hub 120.

Memory 525 may refer to one or more storage components of data hub 120 that may be designed, programmed, and/or configured to store, at least, received data samples and associated timing tables, in accordance with the embodiments and implementations described above.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

I claim:

1. A system, comprising:
   a first device configured to:
      collect a data sample,
      transmit a device timing table, and
      transmit the collected data sample,
      wherein the first device includes a crystal oscillator,
      wherein the device timing table includes:

a powered-on device tick count recorded, per a frequency of the crystal oscillator, when the first device is powered-on, a powered-off device tick count recorded, per the frequency of the crystal oscillator, when the first device is powered-off, and a data sample tick count for the collected data sample;

a second device configured to:

receive the device timing table and the collected data sample from the first device, and determine a real-time clock time stamp for the collected data sample based on the device timing table;

wherein the determine the real-time clock time stamp for the collected data sample based on the device timing table includes:

determine a real-time tick-rate for the first device, assign a real-time time stamp to the powered-on device tick count, determine a difference by subtracting the powered-on device tick count from the tick-count for the respective data samples, and calculate the real-time clock time stamp for the collected data sample by utilizing the real-time tick-rate for the first device and the difference between the data sample tick count for the collected data sample and the powered-on device tick count.

2. The system of claim 1, wherein the gathered data sample is transmitted via Bluetooth Low Energy (BLE).

3. The system of claim 1, wherein the gathered data sample is transmitted via at least one short range wireless connectivity standard protocol.

4. The system of claim 1, wherein the real-time time stamp at which the first device is powered-on is received from an external device.

5. The system of claim 4, wherein the external device is the second device.

6. The system of claim 4, wherein the external device is a relay device.

7. The system of claim 4, wherein the first device is further configured to:

capture a tick count when the data sample is collected, associate the captured tick count with the collected data sample, and transmit the associated tick count with the collected data sample.

8. The system of claim 1, wherein the collected data sample is a biometric sampling of a user of the first device.

9. The system of claim 8, wherein the biometric sampling of the user of the first device includes a pulse rate.

10. A non-transitory computer-readable medium, associated with a wireless device, storing instructions that, when executed, cause one or more processors to perform operations comprising:

receiving a real-time time stamp from an external device upon powering-on of the wireless device;

gathering a data sample;

preparing a data package that includes a device timing table and the gathered data sample;

transmitting the data package to another device;

wherein the wireless device includes a crystal oscillator, wherein the device timing table includes:

a powered-on device tick count recorded, per a frequency of the crystal oscillator, when the wireless device is powered-on, a powered-off device tick count recorded, per the frequency of the crystal oscillator, when the wireless device is powered-off, and a data sample tick count for the gathered data sample, wherein the determine the real-time clock time stamp for the collected data sample based on the device timing table includes:

determine a real-time tick-rate for the first device, assign a real-time time stamp to the powered-on device tick count, determine a difference by subtracting the powered-on device tick count from the tick-count for the respective data samples, and calculate the real-time clock time stamp for the collected data sample by utilizing the real-time tick-rate for the first device and the difference between the data sample tick count for the collected data sample and the powered-on device tick count.

11. The non-transitory computer-readable medium of claim 10, wherein at least the gathering of the data sample is performed when the wireless device is powered off.

12. The non-transitory computer-readable medium of claim 10, wherein the device timing table includes the time-stamp received from the external device.

13. The non-transitory computer-readable medium of claim 10, wherein the external device is the another device.

14. The non-transitory computer-readable medium of claim 10, wherein the external device is a relay device.

* * * * *